May 11, 1965

C. E. MONSEES 3,182,737

GRAVITY SLIDE CHECKWEIGHER

Filed Nov. 13, 1963

INVENTOR
Claude E. Monsees

BY
Bacon & Thomas
ATTORNEYS

May 11, 1965     C. E. MONSEES     3,182,737
GRAVITY SLIDE CHECKWEIGHER
Filed Nov. 13, 1963     2 Sheets-Sheet 2

INVENTOR
Claude E. Monsees
BY Bacon & Thomas
ATTORNEYS

United States Patent Office

3,182,737
Patented May 11, 1965

3,182,737
GRAVITY SLIDE CHECKWEIGHER
Claude E. Monsees, Durham, N.C., assignor to Sperry Rand Corporation, Wilmington, Del., a corporation of Delaware
Filed Nov. 13, 1963, Ser. No. 323,493
7 Claims. (Cl. 177—45)

This invention relates to a checkweighing apparatus of the type normally used in conjunction with a weighing and packaging machine and wherein completed packages of products are checkweighed to separate those of incorrect weight from those having the correct weight of product therein. The checkweigher of the present invention is of a type wherein the packages of product merely slide by gravity over an inclined surface carried by a weighing head and the weight of the packages is thus checked during their gravitational progress along the apparatus.

When an article is placed on a sloping surface, it is a known fact that the pressure transmitted from the article to the surface perpendicular thereto is directly proportional to the weight of the article. However, since gravity acts on the article in a vertical direction oblique to the surface, a further component of force exists which is parallel to the supporting surface. It is this force parallel to the supporting surface that causes the article to slide by gravitation thereover and, due to the coefficient of friction between the sliding surfaces, a force is applied to the supporting body in a direction parallel to the surface. This force on the supporting surface parallel thereto would give an incorrect weight indication if it were permitted to affect the weighing mechanism. That force is not proportional to the weight of the article since it is dependent not only upon the weight but also upon the coefficient of friction between the surfaces and such coefficient is dependent on many variable and transient factors.

The present invention relates to a mechanism for weighing articles sliding over an inclined surface, as referred to above, but wherein the detecting mechanism is responsive only to the forces perpendicular to the surface and is insensitive to forces parallel to the surface. To achieve this result applicant provides a weighing platform having a sloping article supporting surface, the weighing platform being supported from a fixed support by means of leaf springs extending parallel to the sloping surface and thus limiting the weighing platform to movements perpendicular to its sloping surface. The friction forces referred to are thus parallel to the length of the springs and are ineffective to cause any lateral flexure thereof and thus ineffective to produce any spurious weighing movements of the platform. The invention, however, comprises additional novel details to be described more fully hereinafter.

It is, therefore, an object of this invention to provide a gravity slide checkweigher over which articles to be weighed slide in response to the action of gravity and which weigher is responsive only to the true weight of the articles.

Another object is to provide a checkweigher of the type set forth wherein the effects of friction between a weighing platform and a sliding article are completely eliminated.

Still another object is to provide a checkweigher of the type described wherein a single means supports the weighing platform for true weighing movement and also absorbs frictional forces and transmits them to a support without responding thereto in any other respect.

A further object is to provide a checkweigher of the type described, including means for adjusting the angle of inclination of the sloping surface over which the articles slide.

A still further object is to provide a checkweigher as set forth, including a deflector or reject means for deflecting articles of improper weight from their normal sliding path over the apparatus.

An additional object is to provide a checkweigher achieving the aforementioned objectives which is yet simple and economical to construct but highly efficient and reliable in operation.

Additional objects and advantages will become apparent to those skilled in the art as the description proceeds with reference to the accompanying drawings wherein.

Figure 1:
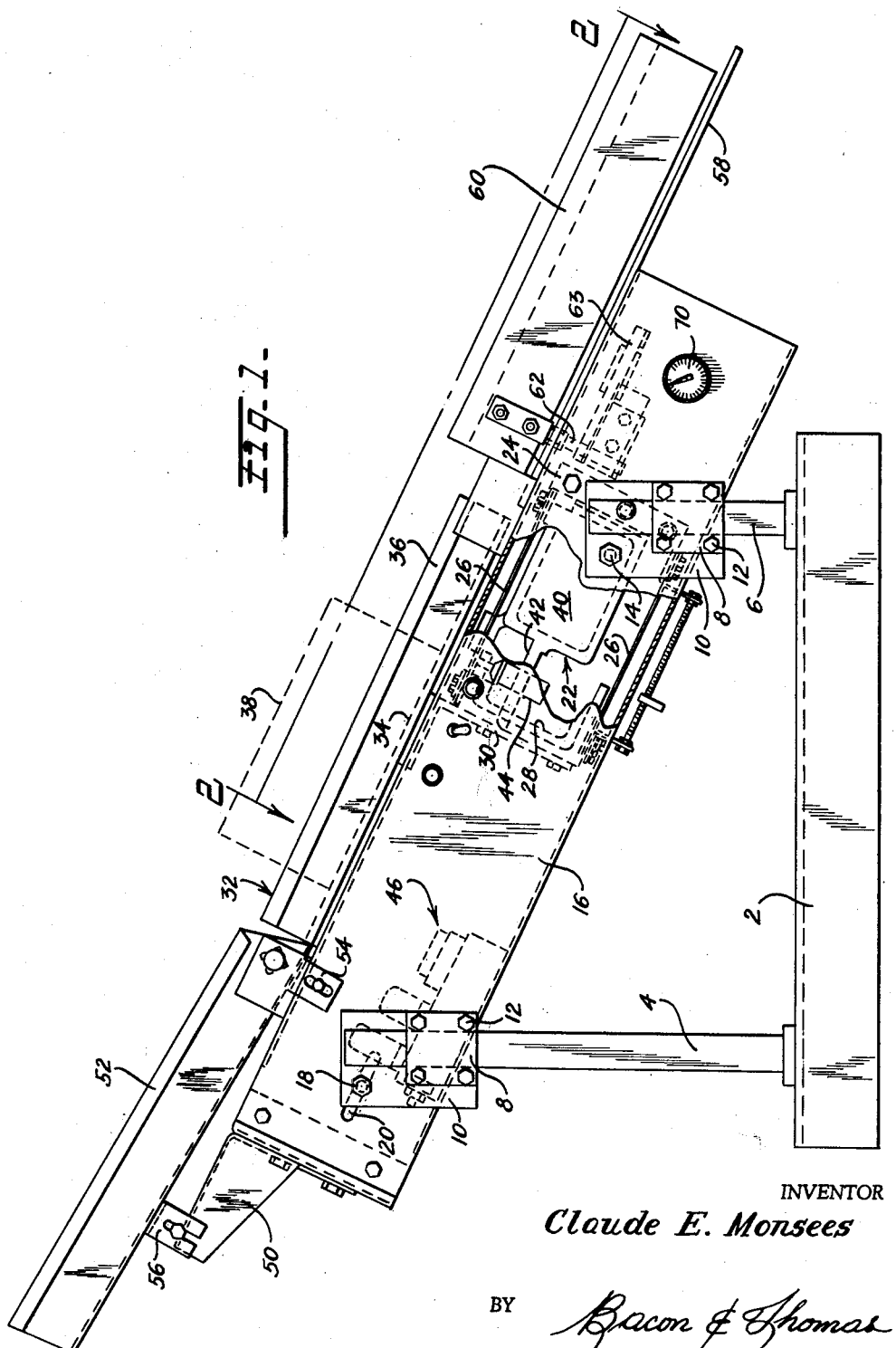
FIG. 1 is a side elevational view of an exemplary form of the invention, parts thereof being broken away to facilitate illustration.
Figure 2:
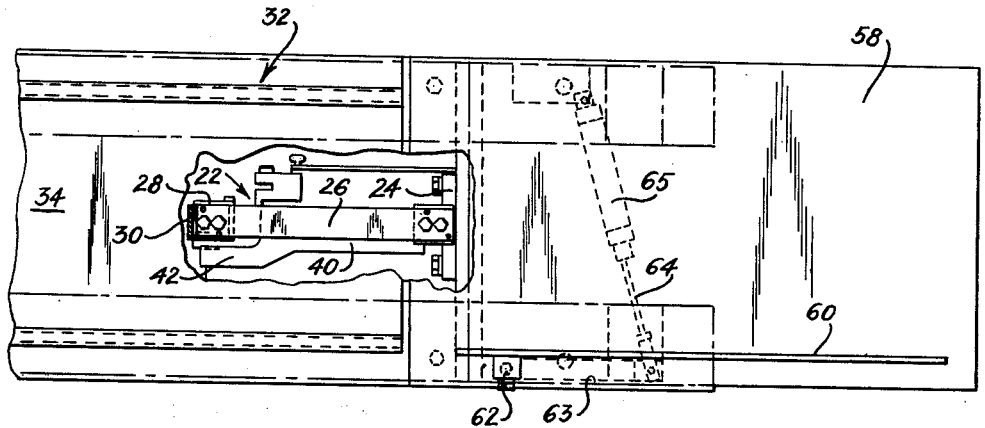
FIG. 2 is a fragmentary top plan view of a portion of FIG. 1, as indicated by the line 2—2 of FIG. 1, with parts broken away to illustrate structure therebelow.
Figure 3:
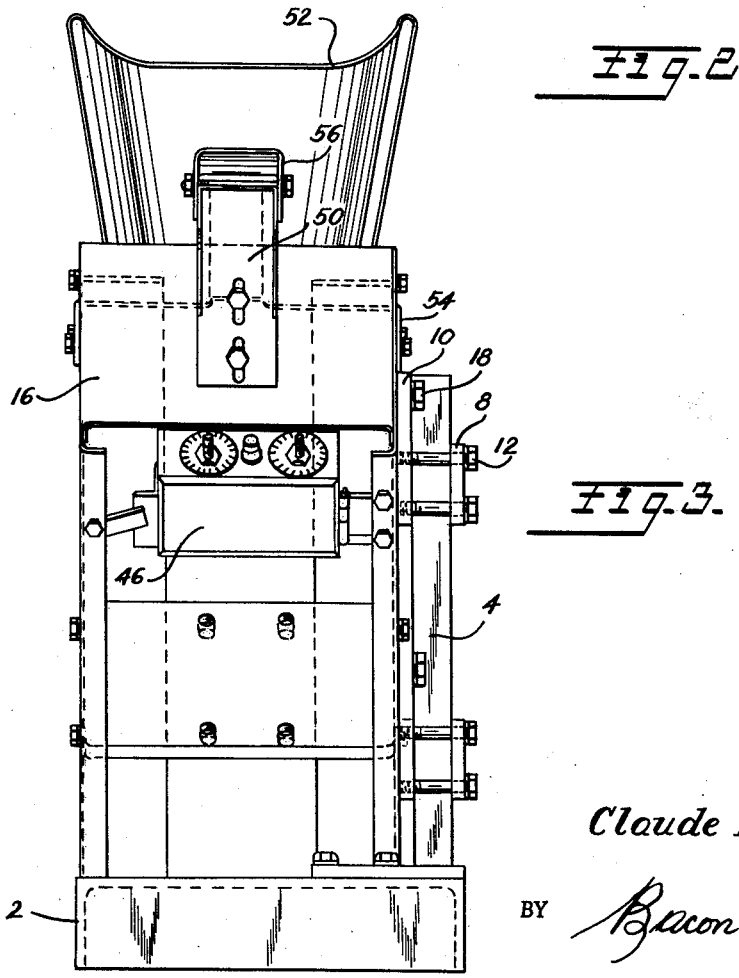
FIG. 3 is an end elevational view of the device of FIG. 1 as seen from the left end thereof.

In the drawings, 2 indicates a suitable base structure having a pair of columns 4 and 6 fixed thereto in upstanding spaced relation. As shown, column 4 is considerably longer than column 6 but if desired, both could be of the same height. Adjustable clamping devices comprising outer plates 8 and inner plates 10 are adjustable along each of the columns since they are releasably clamped to the columns by suitable clamping screws 12. The plate 10, on column 6, is pivotally connected, as at 14, to a supporting frame 16. The inner plate 10 of column 4 is adjustably connected, by bolt or the like 18 to the support frame 16 by passing through an elongated slot 20 in support or frame 16. Thus, it will be obvious that by loosening bolt 18, the support 16 may be pivotally adjusted about the pivot 14 to change the slope thereof for a purpose to be described. Likewise, both clamping arrangements may be loosened and moved vertically on their respective columns to set the entire apparatus at the desired elevation. The support or frame 16 is a box-like enclosure in which a weighing head 22 is mounted. The weighing head 22 is essentially the same weighing head, as fully described and claimed in the copending application of Albert D. Harmon, Serial No. 297,338, filed July 24, 1963. In general, however, the weighing head comprises a fixed portion 24 fixedly secured to the support 16 and a pair of parallel leaf springs 26 fixed at one end to the member 24 and fixed at their other ends to a bracket 28 secured to a further bracket 30 or the like, which is rigidly fixed to a weighing platform 32. The weighing platform 32 comprises a bottom plate 34 having an upper surface substantially parallel to the leaf springs 26 and is further provided with upstanding side flanges 36 to guide an article, as indicated at 38, thereover. Thus, the platform 32 is carried by the support 16 for weighing movements perpendicular to the upper surface of its bottom plate 34 by virtue of its mounting on springs 26. The weighing head includes a stationary portion 40 having an arm 42 upon which a differential transformer 44 is mounted. An armature, movable within the transformer 44, is carried by the bracket 28 whereby the transformer responds to weighing movements of the platform 32. The structure and operation of the weighing head, and particularly the differential transformer and associated circuitry, are fully described in the copending application referred to and need not be further described here. It is to be noted, however, that the circuitry and components responsive to the transformer 44, are mounted within the support 16 and are indicated generally at 46. They comprise suitable electronic detector and control means effective to produce a predetermined electrical output upon deflection of the springs 26 to a predetermined position. The predetermined position referred to is that position to which the platform 32 will deflect the springs 26 when an article 38 of correct weight is on the weighing platform.

For the apparatus to be completely insensitive to the forces created by friction between the article and platform, it is necessary that the springs 26 be essentially truly straight and parallel to the surface of plate 34 when an article of correct weight is on the platform. To this end, the springs 26 are formed to assume an unstressed shape that is not exactly straight and parallel to the plate 34, but so designed that deflection thereof by an article of correct weight will flex them to a truly straight and parallel condition. Thus, when an article of correct weight is moving over the weighing platform no spurious movements are produced by the friction forces because those forces act along the length of the springs and have no components transverse thereto. If the article is of incorrect weight, it is immaterial whether such spurious forces are effective or not since the article will be rejected, as will be described. It is to be noted that such spurious movements cannot result in an erroneous indication of correct weight because only articles of correct weight can flex springs 26 the precise amount necessary to make them truly straight.

The support 16 is provided with a bracket 50 at its upper end for supporting a portion of the "dead plate" guiding means 52. The guiding means 52 is a generally channel shaped member adjustably supported on the support 16 by brackets 54 and 56, secured to support frame 16 and bracket 50, respectively, and serves to direct and guide articles from a previous machine or other supply to and across the weighing platform 32. It is to be noted that, preferably, the guide 52 slopes a slightly greater amount than the platform 32 to eliminate the likelihood of articles coming to rest thereon. The upper surface of the plate 34 of weighing platform 32 is preferably quite smooth and of uniform texture so that the articles 38 may slide thereover under the influence of gravity at a substantially uniform speed. After the articles 38 slide off the lower end of the plate 34, they are received by a further "dead plate" 58 carried by the support 16 at the lower end thereof and which serves to guide and direct articles 38 to a suitable take-away conveyor or other mechanism. A deflector arm 60 is pivotally mounted on the apparatus along one side of the plate 48 and alongside the normal path of movement of articles 38 sliding thereover. The deflector 60 is carried by a pivot 62 pivotally mounted in the support 16 and having crank arm 63 thereon below the plate 58. The outer end of the arm 63 is connected to a movable element 64 constituting part of a reject mechanism 65. The reject mechanism may be a pneumatic cylinder or a solenoid and is effective when energized to swing the deflector 60 inwardly across the path of movement of articles 38 to thus deflect an article laterally off the plate 58 to a second or reject position. The reject mechanism 65 is responsive to the weighing movements of the platform 32 as detected by the transformer 44. When an article of correct weight is on the platform 32, no control signal is fed to the reject mechanism 65 and thus it remains inactive while that article of correct weight slides over the plate 58. However, if an article that is of incorrect weight slides across the platform 32 a signal from the devices 46 causes actuation of reject mechanism 65 to swing deflector 60 across the plate 58 and thus effect rejection and actual physical separation of the article of incorrect weight from those of correct weight.

If desired, the checkweighing apparatus of the present invention may be provided with a counter 70 to indicate the number of articles rejected.

It will be obvious to those skilled in the art that the weighing head 22 could as well be at the upper end of platform 32, with springs 26 sloping downwardly therefrom rather than upwardly, as shown.

While a single specific embodiment of the invention has been shown and described herein, it is to be understood that the same is merely illustrative of the principles involved and that other embodiments may be resorted to within the scope of the appended claims.

I claim:

1. A checkweigher comprising: a support; a weighing platform having a sloping and unobstructed article supporting surface arranged at such an angle to the horizontal that an article to be weighed will slide thereover and therefrom under the influence of gravity; cantilever spring means mounted on said support and supporting said platform for weighing movements in a direction perpendicular to said sloping surface; said spring means comprising at least one resiliently flexible arm extending substantially parallel to said sloping surface; and means responsive to relative movement between said platform and support for determining whether or not an article on said platform is of predetermined weight.

2. A checkweigher as defined in claim 1 wherein said spring means comprises a pair of said resiliently flexible arms arranged in parallel relation in a vertical plane, one end of each arm being secured to said support and the other end of each being fixed relative to said platform.

3. A checkweigher as defined in claim 1 wherein said spring arm is so shaped and configured that when it is flexed by an article of said predetermined weight on said platform, it assumes a substantially straight shape parallel to said surface.

4. A checkweigher as defined in claim 3 comprising a pair of said spring arms arranged in parallel relation in a vertical plane, each of said arms being configured as set forth.

5. A checkweigher as defined in claim 1 wherein said support comprises a movable frame; a base structure; and means mounting said frame on said base structure for angular adjustment in a vertical plane whereby to change the angle of slope of said surface.

6. A checkweigher comprising: a support; a weighing platform having an article supporting surface, said platform being mounted on said support for weighing movement in a direction perpendicular to said surface; a base having spaced upstanding portions; and holding means vertically adjustable along said upstanding portions and secured to said support whereby said support and said surface may be angularly adjusted on said base to dispose said surface at a selected angle of slope relative to the horizontal.

7. A checkweigher as defined in claim 6 including article supporting and guiding means fixed to said support adjacent opposite ends of said platform and arranged to respectively direct articles to said platform for sliding movement thereover and to receive articles sliding off said platform and direct the same to a discharge position.

References Cited by the Examiner
UNITED STATES PATENTS

| | | | |
|---|---|---|---|
| 2,853,189 | 9/58 | Byrkett et al. | 209—121 |
| 3,108,647 | 10/63 | Harmon et al. | 177—1 |

LEYLAND M. MARTIN, *Primary Examiner.*

Notice of Adverse Decision in Interference

In Interference No. 95,328 involving Patent No. 3,182,737, C. E. Monsees, GRAVITY SLIDE CHECKWEIGHER, final judgment adverse to the patentee was rendered Mar. 27, 1968, as to claims 1, 2, and 5.

[*Official Gazette September 24, 1968.*]

Disclaimer 3,182,737.—*Claude E. Monsees*, Durham, N.C. GRAVITY SLIDE CHECK-WEIGHER. Patent dated May 11, 1965. Disclaimer filed Aug. 5, 1968, by the assignee, *Wright Machinery Company, Inc.*

Hereby enters this disclaimer to claims 1, 2 and 5 of said patent.

[*Official Gazette January 7, 1969.*]